United States Patent [19]

Ziaylek et al.

[11] Patent Number: 4,647,374
[45] Date of Patent: Mar. 3, 1987

[54] FLOATING INTAKE HEAD FOR WATER HOSES

[76] Inventors: Michael P. Ziaylek; Theodore Ziaylek, Jr., both of 140 Riverview Ave., Yardley, Pa. 19067

[21] Appl. No.: 743,241

[22] Filed: Jun. 11, 1985

[51] Int. Cl.⁴ .............................................. B01D 21/00
[52] U.S. Cl. ................................ 210/242.1; 210/416.1
[58] Field of Search .................... 210/242.1, 416.1, 460

[56] References Cited

U.S. PATENT DOCUMENTS

| | | | |
|---|---|---|---|
| 2,957,579 | 10/1960 | McCombie | 210/242.1 |
| 3,263,811 | 8/1966 | Baker et al. | 210/136 |
| 3,495,714 | 2/1970 | Barton | 210/460 |
| 3,613,894 | 10/1971 | Clegg, Jr. | 210/456 |
| 3,782,552 | 1/1974 | Wendell | 210/242 |
| 4,179,379 | 12/1979 | Mitchell | 210/242 |
| 4,310,423 | 1/1982 | Brown et al. | 210/791 |
| 4,357,238 | 11/1982 | Ziaylek, Jr. | 210/232 |

FOREIGN PATENT DOCUMENTS 1603872 12/1981 United Kingdom ............. 210/416.1

OTHER PUBLICATIONS

Circular of Fol-Da-Tank Company entitled "Fol-Da-Tank®" (1984).

Primary Examiner—Bernard Nozick
Attorney, Agent, or Firm—Sperry, Zoda & Kane

[57] ABSTRACT

A floating intake or suction head for use in pumping water from a pool, pond, stream or tank through a fire hose or the like, essentially includes two separately formed members, namely a float and a strainer. The strainer is connectable to a length of fire hose, and may be used independently of the float. When used with the float, the strainer and float relatively, slidably interengage, permitting the strainer to be slidably moved into a recess of the float, along a straight line, to a final position in which apertured brackets of the float and strainer align. Normally retracted, spring biased connecting pins mounted on the float are then quickly releasable and under the spring loading thereof shift axially through the brackets of the strainer, thus connecting the strainer to the float. Means on the strainer and float normally interengage the same against relative movement when the strainer reaches the position in which the pins are shiftable to make the connection between the float and strainer, but are quickly releasable to thereafter permit the strainer to pivot upon the pins to a position in which it is at least partially submerged in the body of water on which the float is buoyantly supported. The construction has the advantage of permitting the strainer to be used independently of the float, and the further advantage of permitting a quick connection to be made therebetween, without tools, in total darkness, or under other adverse conditions.

14 Claims, 9 Drawing Figures

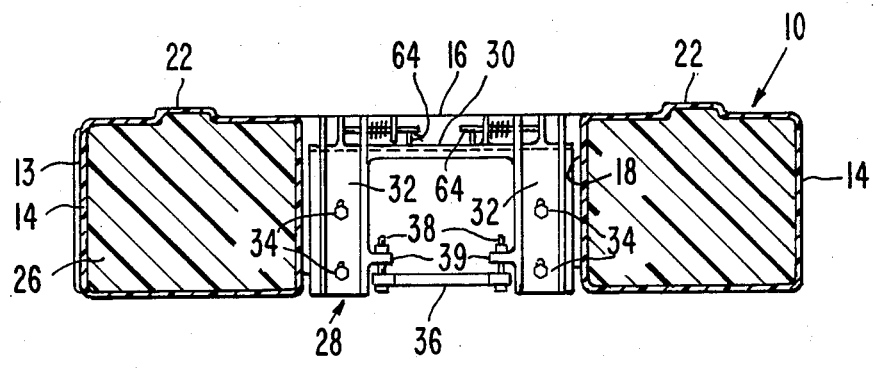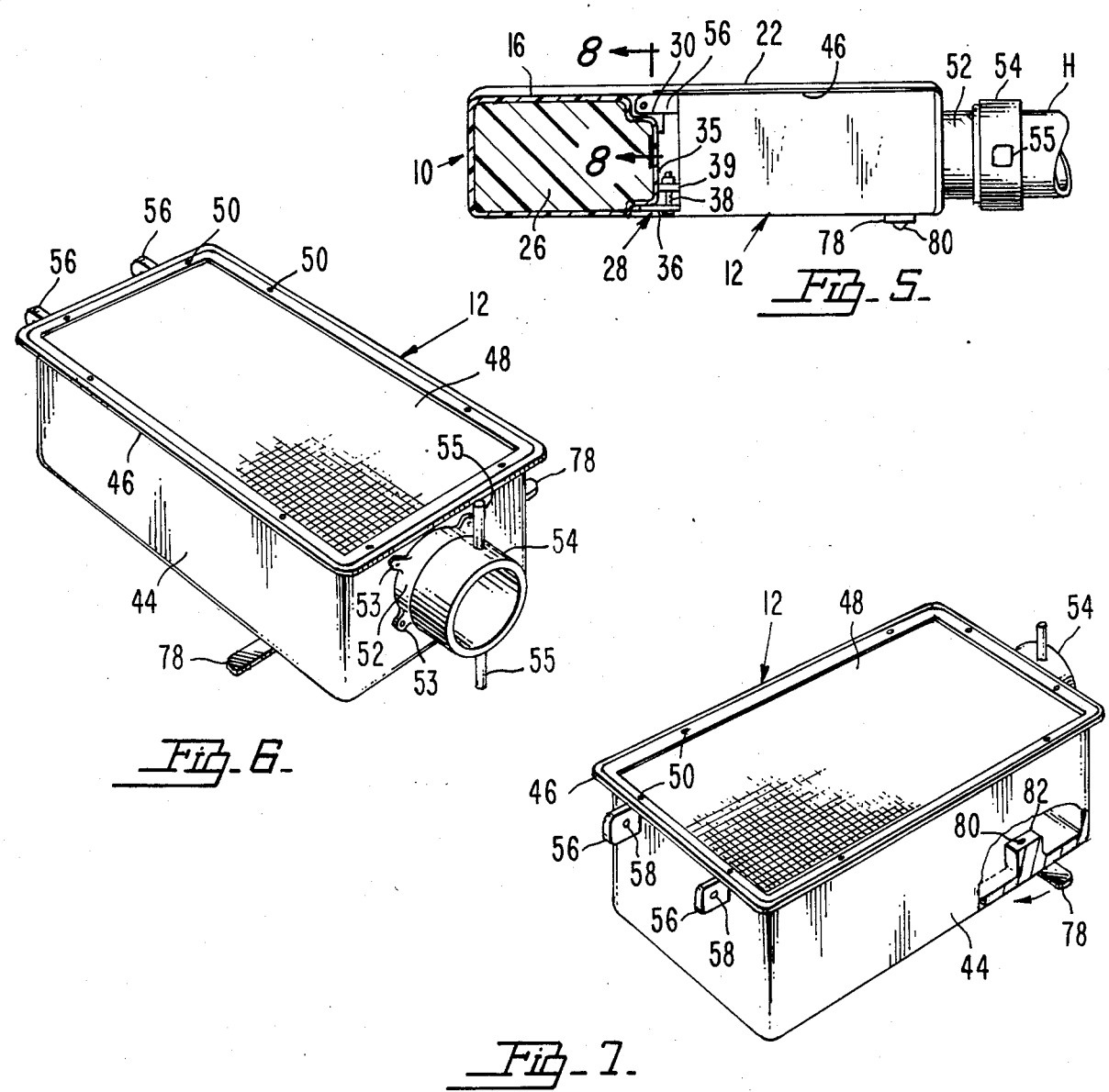

FLOATING INTAKE HEAD FOR WATER HOSES

BACKGROUND OF THE INVENTION

1. Field of the Invention

The present invention relates generally to intake or suction heads for hoses, especially large diameter hoses such as those used by fire fighters. In a more particular sense, the invention has reference to an intake head of the strainer type, which if desired, can be used without an associated float, by being thrown to the bottom of a pond, lake, stream, or swimming pool, from which water is to be pumped. In accordance with the invention, the strainer is detachably, quickly connectable to a float, under conditions in which it is desirable that the strainer not be permitted to go to the bottom.

2. Description of the Prior Art

Heretofore, it has been suggested that strainers for use as intake heads of fire hoses or the like, be connected to floats whereby water may be pumped from just below the surface of a pond, pool or lake. This is desirable, for example, in which the body of water from which the water is to be pumped, has a very muddy, leaf-covered bottom. In such an event, the pumping of the water from the bottom of the pond or stream is impeded substantially if the strainer should become clogged or covered with leaves or other debris. In these circumstances, it is preferable that the strainer be connected to a float to draw water from just below the surface of the water supply.

In devices of this nature previously conceived, problems have arisen, one of which involves the inability, in many instances, of making a swift connection between the strainer and float. During the fighting of a fire, time is of the essence, and the loss of even a few seconds in making a connection between the float and the strainer can permit the fire to blaze beyond control.

In the prior art devices, further use of the strainer as an intake head without its associated float is often affected adversely by reason of the fact that the strainer often has a total intake area that is relatively small in relation to the volume capable of being pumped through the hose to which the strainer is connected. This relatively small intake area can be even further adversely affected by leaves that cover the intake ports of the strainer, until it becomes almost useless. In these circumstances, it may be necessary to halt pumping, while the strainer is removed from the pond, stream, or other water supply, cleaned of clogging debris, and returned for further use.

SUMMARY OF THE INVENTION

Summarized briefly, the present invention includes a strainer in the form of a large, rectangular box or pan, having a substantial depth, and adapted at one end thereof to be coupled to a hose, such as a fire hose, of a selected diameter. In accordance with the invention, the coupling can be swiftly changed, to permit couplings to be made to hoses of various diameters, at the option of the fire fighting company.

The strainer has a cover formed as a screen of a large or coarse mesh, the area of which is designed to be in excess of the capacity of any fire hose to which the strainer may be connected. The size of the screen, resulting from the configuration of the strainer box or pan, assures that there will be an ample supply of water, even if some of the openings of the screen become clogged by leaves or other debris.

In accordance with the invention, the strainer box can be purchased separately by fire fighting companies, if the company finds no need for using an associated float. If, however, a float is used, then the strainer and float provide a combination of parts that interact in a way to facilitate the efficient use of the strainer for the pumping of water from just below the surface of a pond, stream or the like.

To this end, the invention includes a float which is of U shape, having a recess opening at one end thereof, the recess being rectangular, to closely correspond to the rectangular shape of the strainer. The side portions of the float body, and the strainer itself, are provided with means that permit the strainer to be slidably guided into the recess, to a final position in which brackets on the strainer and the float move into registration. Mounted on the float are pins, which are under spring bias but which are normally held in retracted positions. When the strainer moves to its final position, the pins are swiftly released, and under the spring loading thereof are instantaneously shifted in an axial direction, to pass through the strainer and float bracket. The strainer is thus releasably connected to the float. At this time, pivoted stops on the strainer are moved out of the way, and the strainer is now free to swing on the pins to a position in which it will drop below the float a distance sufficient to assure to the maximum against being clogged by floating debris, as well as leaves or other trash covering the bottom of the body of water in which the device is being used.

BRIEF DESCRIPTION OF THE DRAWING

While the invention is particularly pointed out and distinctly claimed in the concluding portions herein, a preferred embodiment is set forth in the following detailed description which may be best understood when read in connection with the accompanying drawings, in which:

FIG. 4 is an enlarged, transverse sectional view through the float substantially on line 4—4 of FIG. 1, the strainer box being removed;

FIG. 5 is a longitudinal sectional view through the float with the strainer box shown in side elevation, taken substantially on line 5—5 of FIG. 3, the strainer box being shown connected to the float but not released for swinging movement to the use position thereof shown in FIG. 1;

FIG. 6 is an enlarged, front perspective view of the strainer box per se;

FIG. 7 is a rear perspective view of the strainer box per se, on substantially the same scale as FIG. 6, a portion of the strainer box being broken away;

DESCRIPTION OF THE PREFERRED EMBODIMENT

Figure 1:
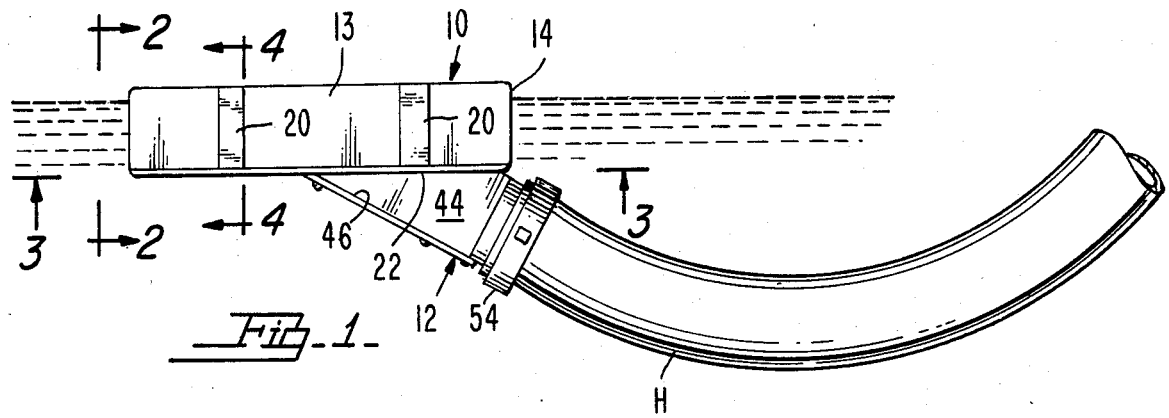
FIG. 1 is a side elevational view of a floating intake head in accordance with the invention, as it appears when in use, a fire hose being illustrated fragmentarily.

Referring to the drawing in detail, the reference numeral 10 generally designates a float, to be used in association with a strainer generally designated 12. These are formed as wholly separate members, for reasons which will be discussed in further detail hereafter.

Figure 3:
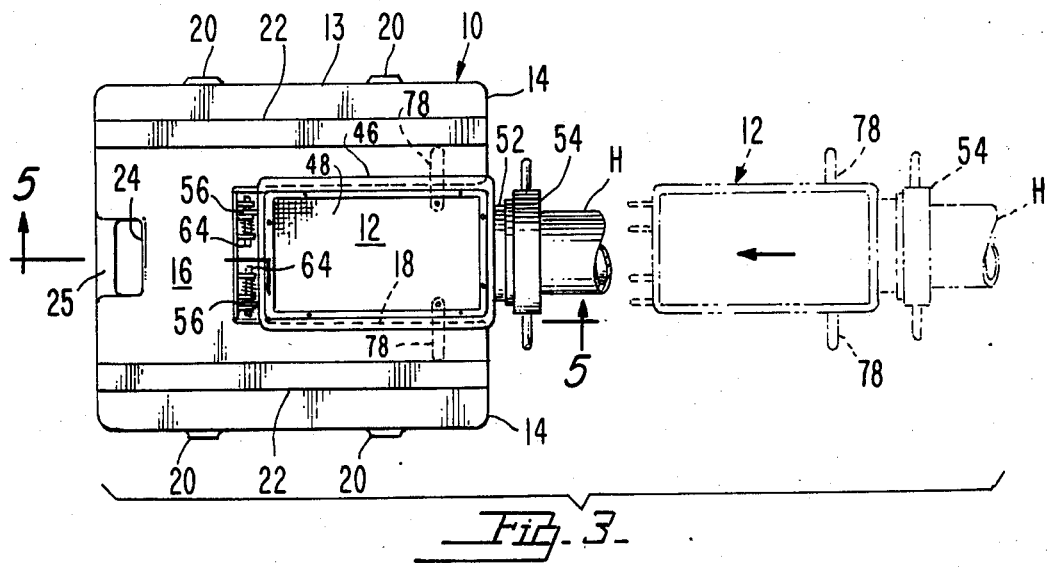
FIG. 3 is a bottom plan view of the device as seen from line 3—3 of FIG. 1, the strainer being shown in dotted lines as it appears when being shifted toward the float preparatory to connecting the same, and in full lines as it appears when the connection of the strainer to the float has been made.
Figure 2:
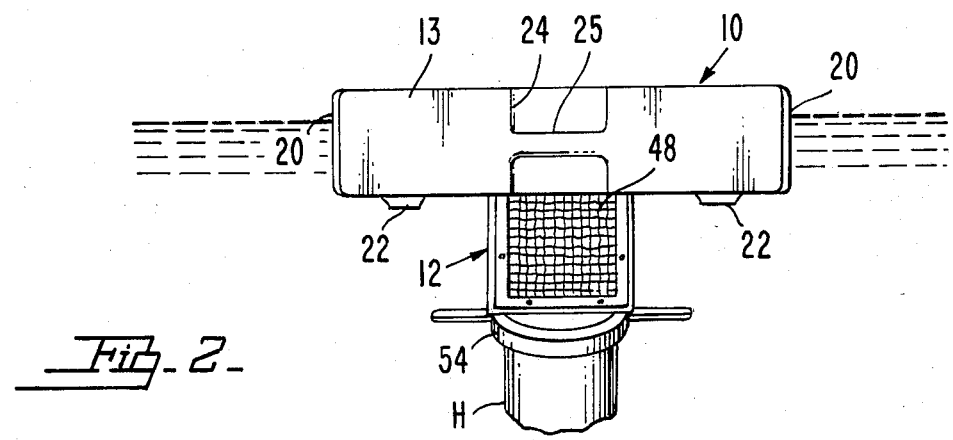
FIG. 2 is an end elevational view of the device as seen from line 2—2 of FIG. 1.

Considering first the construction of the float 10, this essentially comprises a buoyant, hollow, molded plastic body 13 formed, as best shown in FIG. 3, as a generally U shaped member having parallel, transversely spaced side portions 14 integral at one end of the body with a connecting portion 16, thus defining a rectangular recess bounded by the side and connecting portions, and opening upon the other end of the body.

It is important that body 13 be of rugged, long-lived construction, and to this end, the body is provided with a relatively thick wall over its entire area, and is strongly reinforced by side reinforcing ribs 20 (FIG. 1) and longitudinal ribs 22. Ribs 20, 22 also serve to support the body away from adjacent supporting surfaces, to prevent damage both to the float body and to the surfaces on which the float body may be carried when not in use. Longitudinal ribs 22, further, have the important function of serving as skids upon which the body can be supported while being dragged across the ground between the fire truck and a body of water in which the float is to be placed for use.

Normally, the float would be stowed away in a compartment provided therefor upon a fire truck, or may be hung or clamped to any other supporting surface upon the vehicle. Facilitating its portability is a handle recess 24 molded into the end of the body opposite that in which the recess 18 is formed, the handle recess being spanned by a molded handle 25. It will thus be seen that the handle 25 permits the entire device to be carried with maximum ease, or used for pulling the device along the ground.

To assure that the float body will remain buoyant even if the wall thereof should be penetrated, the interior of the body is filled, during the manufacture thereof, with polyurethane foam or other buoyant material, which when pumped into the body becomes hardened to assure that the body will remain buoyant even though a crack or aperture should be accidentally formed in the wall thereof.

Means is provided upon the float for detachably connecting the strainer 12 thereto. The mounting means for the strainer has been generally designated 28 and in the preferred embodiment includes a main mounting plate 30, formed of a metal material, and mounted within a stepped inner wall portion of the connecting portion 16 of the float body. Mounting plate 30 includes (see FIG. 4) depending plates 32, each of which is formed with slots receiving connecting bolts 34, the connecting bolts being threadedly engaged with suitable, mating fastener elements or inserts, not shown, provided in the wall of the connecting portion 16.

Referring to FIGS. 4 and 5, the inner wall 35 of the connecting portion 16 has a second stepped portion opposite that receiving plate 30. In the second stepped portion there is mounted a transversely extending clamping plate 36, receiving clamping bolts 38 that extend through laterally projecting ears 39 (FIG. 4) integrally formed upon the plates 32. Plate 36, and also plate 30, are rigidly secured to the stepped portions of the inner wall 35 by means of screws 40 (FIGS. 8 and 9) engaged in inserts 42 that are embedded in the plastic material forming the wall of body 13.

In this way, an extremely rugged, permanent mounting means is provided upon the float, adapted for separably connecting the strainer 12 thereto.

Considering now the construction of the strainer 12, this includes a rectangular, deep strainer housing or pan 44 formed as a heavy, cast metal member. Pan 44 is formed with a peripheral, outwardly directed, continuous, recessed flange 46 receiving the rectangular, mating frame of an open mesh wire screen 48. Screws 50, spaced about the frame of the screen, threadedly engage in the flange 46, to secure the screen in place. In this way, a large intake area is provided for a hose H coupled to the strainer.

For the purpose of connecting the hose to the strainer, there is provided a cast metal, cylindrical, large diameter coupling fitting or neck 52, which as shown in FIG. 6, is formed at angularly spaced intervals with outwardly directed ears 53, through which screws extend to secure the fitting 52 to the adjacent end wall of the pan. The pan is provided with an opening in said end wall, registering with the fitting 52.

Rotatably mounted upon the hose coupling or attaching member 52 is an internally threaded collar 54 having radially outwardly extending handles 55 to facilitate the use of the collar in coupling the hose H to the fitting or neck 52. The hose is conventional, and would be provided with a threaded connecting fitting, not shown, engaged by the threads of the swiveled collar 54.

Figure 8:
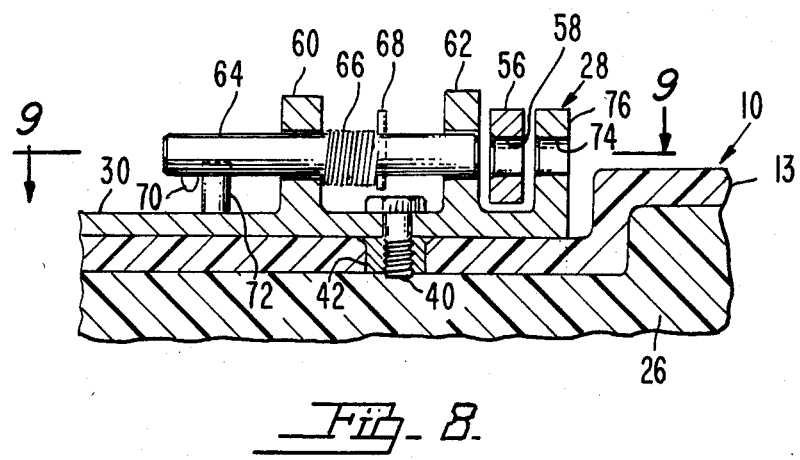
FIG. 8 is a greatly enlarged detail, fragmentary sectional view on line 8—8 of FIG. 5, showing the means for connecting the strainer to the float.
Figure 9:
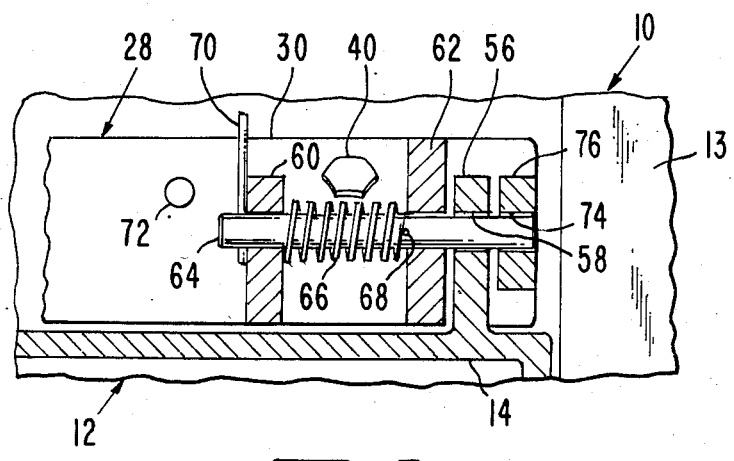
FIG. 9 is a fragmentary, detail sectional view on the same scale as FIG. 8, taken substantially on line 9—9 of FIG. 8.

At the other end of the pan 44, the pan is integrally formed with rearwardly projecting, transversely spaced ears or brackets 56, which, as shown in FIG. 8 and also in FIG. 9, have openings 58. Integrally formed upon the mounting plate 30 are upstanding brackets 60, 62 having openings adapted to register with the openings 58 of the strainer, when the strainer is moved inwardly within recess 18 to the full line position shown in FIG. 3.

There is provided a pair of brackets 60, 62 adjacent each of the ears 56, when the strainer box is moved into its final position ready for connection to the float. Within the openings of said adjacent brackets, pins 64 are slidably and rotatably mounted. Pins 64 are normally in the retracted position shown in FIG. 8. In these circumstances, the pins are in positions in which compression, coil springs 66, which extend about the respective pins, are fully compressed. Thus, the pins are spring loaded to shift axially, whenever released from their FIG. 8 positions, to advanced positions shown in FIG. 9.

Springs 66 are engaged at one end against the respective brackets 60 of mounting plate 30. At their other ends, the springs abut against cross pins 68 or equivalent abutment means, provided upon the respective pins 64.

On each pin, there is provided a radial handle 70. When the pins are retracted, they can be rotated to positions in which the handles 70 engage in back of upstanding stop lugs or retention pins 72 integrally formed upon or otherwise rigidly connected to the plate 30. As a result, the pins are normally retracted as in FIG. 8.

Also integrally formed upon the plate 30, at its opposite ends are upstanding, connecting brackets 76, having openings 74 aligned with the pin 64.

Referring now to FIGS. 3, 6 and 7, it will be noted that adjacent the front end of the pan 44, that is, the end to which hose H is coupled, the pan is provided, at opposite sides thereof, with pivoted arms 78, which serve both a guiding and locking function. Arms 78 are pivotally attached to the bottom of the pan, at opposite sides thereof, by pivot pins 80. The pan, as shown in FIG. 7, may be cast with reinforcing lugs 82 to receive the pins 80.

OPERATION

In use of the device, it should be noted at this point that the National Fire Protection Association has set forth requirements for fire fighting companies, one of which is that their equipment include a water intake head of the strainer type. Accordingly, it is common practice to leave the required strainer attached to a hose section specially formed for use at the suction end of the hose through which water must be pumped from a pond, stream or other body of water to the scene of the fire.

It is also true, at least at the present, that the National Fire Protection Association leaves it optional with fire fighting companies, to purchase a float of the type adapted to support the suctional intake head near the surface of the body of water.

For this reason, it becomes important to provide a strainer which can be used either alone, or can be swiftly connected to and disconnected from an associated float.

Assuming that the strainer is to be connected to the float, it is moved from the position shown in dotted lines in FIG. 3 in the direction of the arrow shown in that Figure of the drawing. Moving into the recess 18, the outwardly directly longitudinal or side portions of flange 46 of the strainer pan 54 slidably engage the top surfaces of the side portions 13. Arms 78, directed laterally outwardly as shown in FIG. 3, slidably engage the undersides of the side portions 16 of the float, as the pan nears its fully inserted position within the recess. In these circumstances, it will be seen that the float and the strainer interengage for relative linear sliding movement as the strainer box moves inwardly of the recess to its final position shown in full lines in FIG. 3.

The strainer is thus guided by the side portions of the float body to its final position, and as a result, merely inserting the strainer into the recess will ultimately cause the ears 56 (see FIGS. 8 and 9) to move between the adjacent brackets 62, 76 of the float. The float limits the inward movement of the strainer beyond a position in which the opening 58 of each bracket 56 of the strainer is registered with the adjacent openings of the brackets 62, 76 of the float.

One simply then throws handle 70 upwardly out of engagement with the lugs 72. Springs 66, being now free to expand, axially bias the pins 64 from their FIG. 8, retracted positions to their advanced, FIG. 9 positions. In these circumstances, the pins 64 pass through the openings 58 of the strainer brackets 56, thus separably connecting the strainer to the float.

The retaining arms 78, cooperating with flanges 46, at this time prevent relative movement of the float and strainer about the axis defined by the pins 64. The user now swings the arms 78 to retracted positions shown in dotted lines in FIG. 7, as a result of which the strainer box is freed for pivotal movement about the common axis of pins 64. The device is inverted to the position shown in FIG. 1, and is placed in the body of water.

The strainer will be free, under its own weight and the weight of the hose H, to pivot to the FIG. 1 position, thus assuring that the strainer will be completely submerged below the surface, a distance sufficient to assure that no floating debris will be sucked against the surface of the screen 48 as water is pumped out of the body of water that is being used as the water supply. At the same time, of course, the support of the strainer above the bottom similarly minimizes the possibility of mud or debris found upon the bottom, being sucked up against the wire mesh screen.

The device has, of course, the very desirable characteristic that the connection of the strainer to the float is effected with maximum speed and ease. Merely by inserting the strainer into the recess of the float, assurance is provided that the strainer will be guided along the exact path necessary to align its apertured bracket 56 with the pins 64 when the strainer is moved into the recess to its final position. This can be done even in complete darkness, with no requirement of special tools, and in only a few seconds. With the strainer fully inserted, one simply throws the handles 70 upwardly, as a result of which the connection between the strainer and the float is made, allowing the strainer to pivot to its use position with the arms 78 in their retracted positions.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. A floating intake head for water hoses, comprising:
   (a) a float;
   (b) a strainer formed wholly separately from the float and adapted to be coupled to a water hose, said strainer including a hollow housing having an outlet and a hose coupling in communication with said outlet for connecting a water hose in communication with the housing, said housing having a flange defining an inlet through which water may be drawn for passage through the housing to the outlet and the hose connected thereto, said strainer furter including a screen extending over the inlet and connected to the flange; and
   (c) means for quickly, separably connecting the strainer to the float in position for drawing water into the hose through the strainer, comprising a guideway formed in the float and having an open and a closed end, the float having an abutment at the closed end of the guideway, the strainer housing being slidably, removably interengageable with said guideway for movement therealong to a position in which it abuts against the float, and normally retracted connecting pins mounted on the float for advancement into engagement with the housing when the housing is in said position, said pins when so advanced providing a hinge connection of the strainer to the float following the slidable guiding of the strainer to said position.

2. A floating intake head as in claim 1 wherein the float is formed with a recess having an end surface at its closed end defining said abutment, said recess having side surfaces forming opposite sides of the guideway, said housing having side walls disposed in closely spaced parallel relation to said side surfaces responsive to slidable movement of the housing into abutting relation to the end surface of the recess, whereby to proportion the recess to receive the strainer when the strainer is to be connected to the float.

3. A floating intake head as in claim 2 in which the float is formed as a substantially U-shaped, buoyant body, providing side portions thereon and an end portion that connects the side portions and cooperates therewith to define said recess, said side and end surfaces of the recess being formed on said side and end portions respectively.

4. A floating intake head as in claim 3 wherein the side portions form guide surfaces that are defined by the side surfaces of the recess, said guide surfaces being spaced apart transversely of the recess a distance slightly in excess of the transverse distance between the side walls of the housing so as to lead the strainer into the recess to a position in which said connecting means may be operated to connect the strainer to the float.

5. A floating intake head as in claim 4 wherein said pins are disposed adjacent one face of the body to locate the hinged connection of the strainer to the float body in a position in which the strainer is free to swing downwardly out of said recess within a body of water on which the float is buoyantly supported.

6. A floating intake head as in claim 5 in which the strainer includes means adapted to engage the body to prevent said swingable movement of the strainer, said last named means comprising a pair of retaining arms mounted on the side portions of the housing for movement into and out of positions in which said arms engage the float body to block said downward swinging movement of the housing 7. A floating intake head as in claim 6 wherein said retaining arms engage one surface of the float body and the strainer includes a flange engaging the other side of the body, said flange and retaining arms being in slidable contact with the side portions of the float body during movement of the strainer into the recess, to cooperate with said side portions in guiding the strainer into a position in which said pins when advanced will connect the strainer to the float.

8. A floating intake head for use in pumping water from ponds, pools, tanks, and the like, comprising:
 (a) a readily portable float adapted to be placed in a supply of water from which water is to be pumped;
 (b) at least one connecting pin mounted on the float for axial movement between retracted and advanced positions;
 (c) a strainer adapted to be connected to a hose through which water is to be pumped from said water supply, said strainer including a hollow housing having an outlet and a hose coupling in communication with said outlet for connecting a water hose in communication with the housing, said housing having a flange defining an inlet through which water may be drawn for passage through the housing to the outlet and the hose connected thereto, said strainer further including a screen extending over the inlet and connected to the flange; and
 (d) brackets on the strainer housing having apertures alignable with the pin and receiving the pin when the pin is shifted axially to its advanced position, for quickly, separably connecting the strainer to the float, the float having a guideway and the strainer housing being snugly, slidably engageable with the guideway, said housing being slidably movable in the guideway to a position aligning the apertures of the brackets with said pin.

9. A floating intake head for water hoses as in claim 8 further including means for normally restraining the connected float and strainer against relative movement, and for freeing the same, at the option of a user, for relative movement to positions in which the strainer will be at least partially submerged in said body of water when the float is placed therein, said restraining means being in the form of flanges and restraining arms on the housing, said flanges and arms engaging the float body at spaced locations in positions blocking the float and strainer against relative movement.

10. A floating intake head for water hoses as in claim 9 wherein said pin, when advanced to connect the float and strainer, hinges the strainer to the float to permit said relative movement thereof.

11. A floating intake head for water hoses as in claim 10 wherein the float and strainer are formed as wholly separate members, said flange and restraining arms extending from the strainer housing into slidable contact with the float body at opposite sides of the guideway to interengage the float and strainer for relative, linear sliding movement to a position in which the pin connects the strainer to the float for relative hinged movement.

12. A floating intake head for water hoses as in claim 10 further including abutment means on the float normally engaging the pin against movement from its retracted to its advanced position.

13. A floating intake head as in claim 12 wherein said pin-engaging abutment means comprises inter-engaging projections on the float and pin respectively, the pin being rotatable as well as axially shiftable to disengage said projections and thereby free the pin for movement to its advanced position.

14. A floating intake head for water hoses comprising:
 (a) a float;
 (b) a strainer formed wholly separately from the float, said strainer including a hollow housing having an inlet and an outlet and a flow passage extending therebetween, a hose coupling connected to the housing in communication with the outlet, and a screen extending across the flow passage; and
 (c) means on the float and strainer providing a guideway relatively, slidably interengaging the float and strainer, said means comprising parallel, transversely spaced side portions on the float and an end portion connecting the side portions and forming an abutment therebetween, said end and side portions forming a recess in the float for the strainer housing, said side side portions providing said guideway and said housing including projections extending outwardly therefrom into slidable contact with the respective side portions responsive to insertion of the housing in the recess to slidably mount the housing on the float for slidable movement into the recess into engagement with the end portion of the float; and
 (d) means on the float and strainer releasably connecting the same for relative pivotal movement in one position to which they are relatively slidably moved, comprising pins on float and brackets on the strainer housing having apertures aligning with the pins responsive to slidable movement of the strainer housing into abutting engagement with said end portion of the float, said pins being mounted in normally retracted positions and being shiftable from said retracted positions through the bracket apertures to hingedly connect the housing to the float.

* * * * *